United States Patent [19]

Bukszar et al.

[11] Patent Number: 6,133,916

[45] Date of Patent: *Oct. 17, 2000

[54] GRAPHICAL USER INTERFACE PROVIDING ACCESS TO FILES DOWNLOADED OVER A NETWORK

[75] Inventors: Anna Elizabeth Bukszar, Arlington Heights, Ill.; Clifford Alan Pickover, Yorktown Heights, N.Y.; Daniel James Winarski, Tucson, Ariz.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 09/056,915

[22] Filed: Apr. 8, 1998

[51] Int. Cl.[7] .................................................. G06F 3/00
[52] U.S. Cl. ............................................. 345/335; 345/356
[58] Field of Search ...................................... 345/333, 334, 345/335, 339, 346, 348, 356, 357; 707/3, 10, 513, 531

[56] References Cited

U.S. PATENT DOCUMENTS

| | | |
|---|---|---|
| 5,623,589 | 4/1997 | Needham et al. . |
| 5,630,042 | 5/1997 | McIntosh et al. . |
| 5,742,816 | 4/1998 | Barr et al. ..................................... 707/3 |
| 5,778,372 | 7/1998 | Cordell et al. ............................ 707/513 |
| 5,802,530 | 9/1998 | Van Hoff ................................. 345/375 |
| 5,860,074 | 1/1999 | Rowe et al. ............................... 707/10 |

OTHER PUBLICATIONS

Tufts University Web Site http://www.perseus.tufts.edu/UG/ch4.htm, Perseus Project, Chapter 4, Oct. 1997.

*Primary Examiner*—Raymond J. Bayerl
*Assistant Examiner*—Cao H. Nguyen
*Attorney, Agent, or Firm*—David W. Victor; Konrad Raynes & Victor LLP

[57] ABSTRACT

Disclosed is a system for displaying and accessing information on files, such as HTML web pages, downloaded from a server over a network, such as the Internet. A monitor linked to a computer displays a graphical user interface, such as web browser. The computer is linked to the network. The graphical user interface is used to download a plurality of files from the server over the network. The files downloaded from the server are stored in a cache associated with the computer. At least one graphical representation of a file stored in the cache is displayed in a display region of the graphical user interface. An input means may be used to select a file by selecting with the input means one of the displayed graphical representations of the files. The input means is further used to cause the display of data stored in the selected file in the display region of the graphical user interface.

45 Claims, 6 Drawing Sheets

GRAPHICAL USER INTERFACE PROVIDING ACCESS TO FILES DOWNLOADED OVER A NETWORK

BACKGROUND OF THE INVENTION

1. Field of the Invention

The field of the present invention relates to providing a graphical representation of files downloaded over a network and, in particular, a system for accessing, viewing, and displaying data from the files by manipulating the graphical representation of the files.

2. Description of the Related Art

Internet web browsers, such as the Netscape Communicator™ and Microsoft Corporation's Internet Explorerm, include a "bookmark" feature that allows users to save the Uniform Resource Locator (URL) address of web pages they download. By selecting the "bookmark" feature in the user interface, the user can view a list of "bookmarked" web pages. The "bookmark" list displays a name for the "bookmarked" page. Also maintained, but not displayed, is the URL address of the page on the Internet. When a user selects one of the listed bookmarks, the browser goes on-line to access the data maintained at that URL for the selected bookmark entry. In the Microsoft Explorer™, the "Favorites" selectable item displays bookmarked web pages. This bookmark feature does not automatically display the data from a previously displayed page, but merely provides the URL for the page.

FIG. 1 illustrates a computer display screen 2 displaying the user interface 4 generated with the Netscape Communicator™ web browser. The selection of the "Bookmarks" 6 selectable item displays a bookmark window 8 that lists "bookmarked" web pages. By selecting one of these bookmark entries, the web browser goes on-line to download the data from the URL address for the selected bookmark. For instance, if the user selects the "Patent" item in the bookmark 8 window, the browser will go to the URL address for the "Patent" bookmark, e.g., the International Business Machines, Corporation's (IBM) patent server at http://www.patents.ibm.com/.

FIG. 2 illustrates the display of a "Go" window 10 displayed upon selection of the "Go" file item 12 from the menu in the user interface 4 of FIG. 1. The "Go" window 10 displays descriptive titles of the last nine web pages a user has visited. These pages are stored in a cache of the computer. Upon selection of an item from the "Go" window 10, the computer loads the cached web page into the browser interface 4 for display. The user may also use the selectable items "Back" 14 and "Forward" 16 to scroll backwards or forwards through a limited number of the most recent accessed web pages.

The "bookmark" feature requires that the user go on-line to download the page. The bookmark feature would needlessly consume network resources if the user only wanted to view the contents of the bookmarked page and did not have to view the most recent content maintained at the on-line URL location. The "Back" 14, "Forward" 16, and "Go" 12 features are also limited because the user can only scroll to a limited set of the most recent pages stored locally. Thus, the above web browser features are limited in that they do not provide the user immediate access to a preferred set of previously accessed pages.

SUMMARY OF THE INVENTION

To overcome the limitations in the prior art described above, the present invention discloses a system for displaying and accessing information on files downloaded from a server over a network. A monitor linked to a computer displays a graphical user interface. The computer is linked to the network. The graphical user interface is used to download a plurality of files from the server over the network. The files downloaded from the server are stored in a cache associated with the computer. At least one graphical representation of a file stored in the cache is displayed in a display region of the graphical user interface. An input means may be used to select a file by selecting with the input means one of the displayed graphical representations of the files. The input means is further used to cause the display of data stored in the selected file in the display region of the graphical user interface.

In further embodiments, a Uniform Resource Locator (URL) for each file is stored in the cache. The URL identifies the route to the file in the network. The input means may be used to request and download data from the URL location in the network to the computer. The downloaded data may then be displayed in the display region of the graphical user interface.

In yet further embodiments the graphical representation is a miniature of a page of data in the file.

The preferred embodiments provide immediate access to files previously downloaded over a network. The preferred embodiments also provide for access, viewing and updating of data from files previously downloaded over the network.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware and Software Environment

Figure 1:
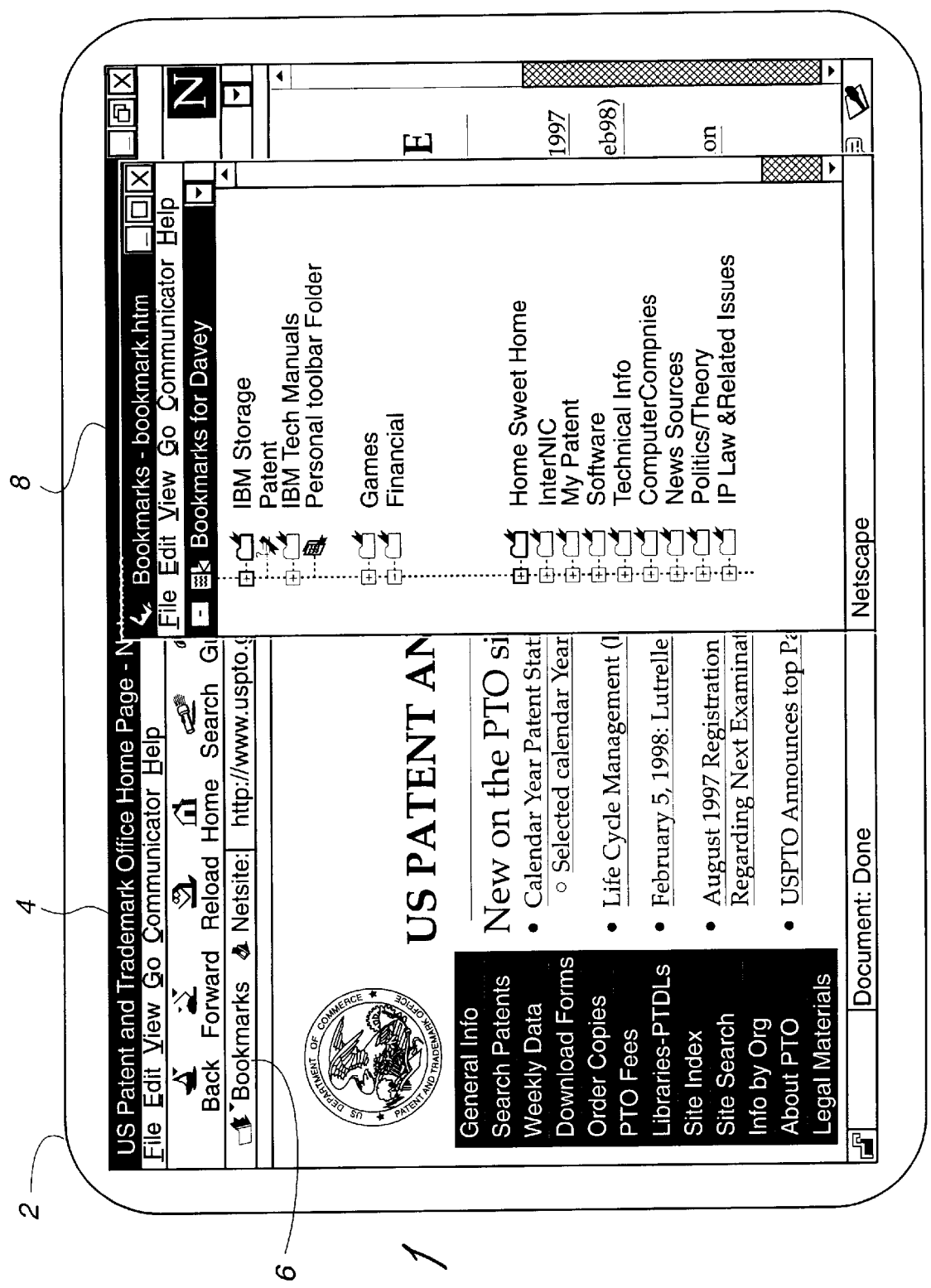
FIG. 1 illustrates a prior art web browser and the bookmark feature.
Figure 2:
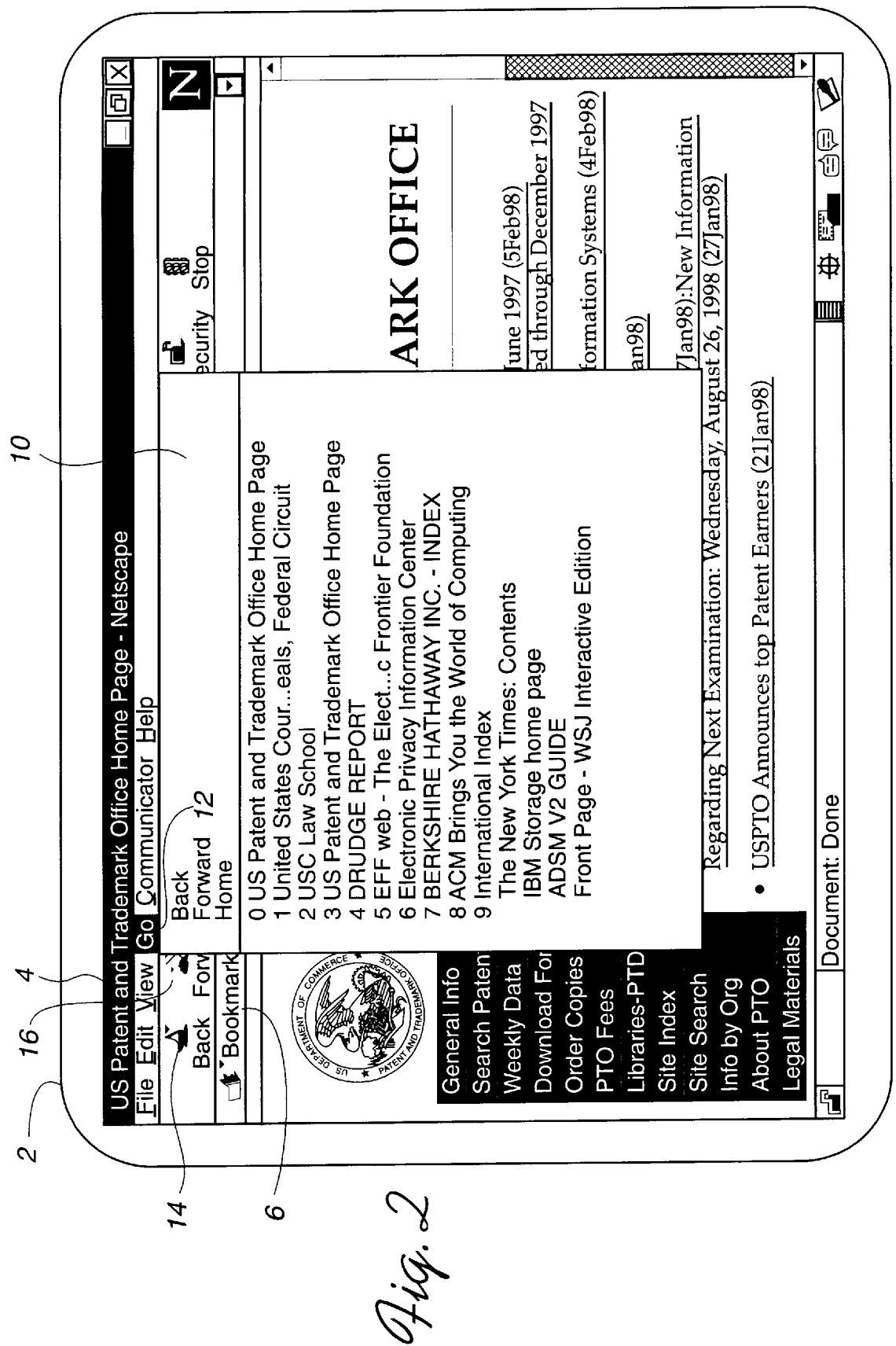
FIG. 2 illustrates a prior art web browser and the "Go" menu item for scrolling through a limited number of the most recently visited web pages.
Figure 3:
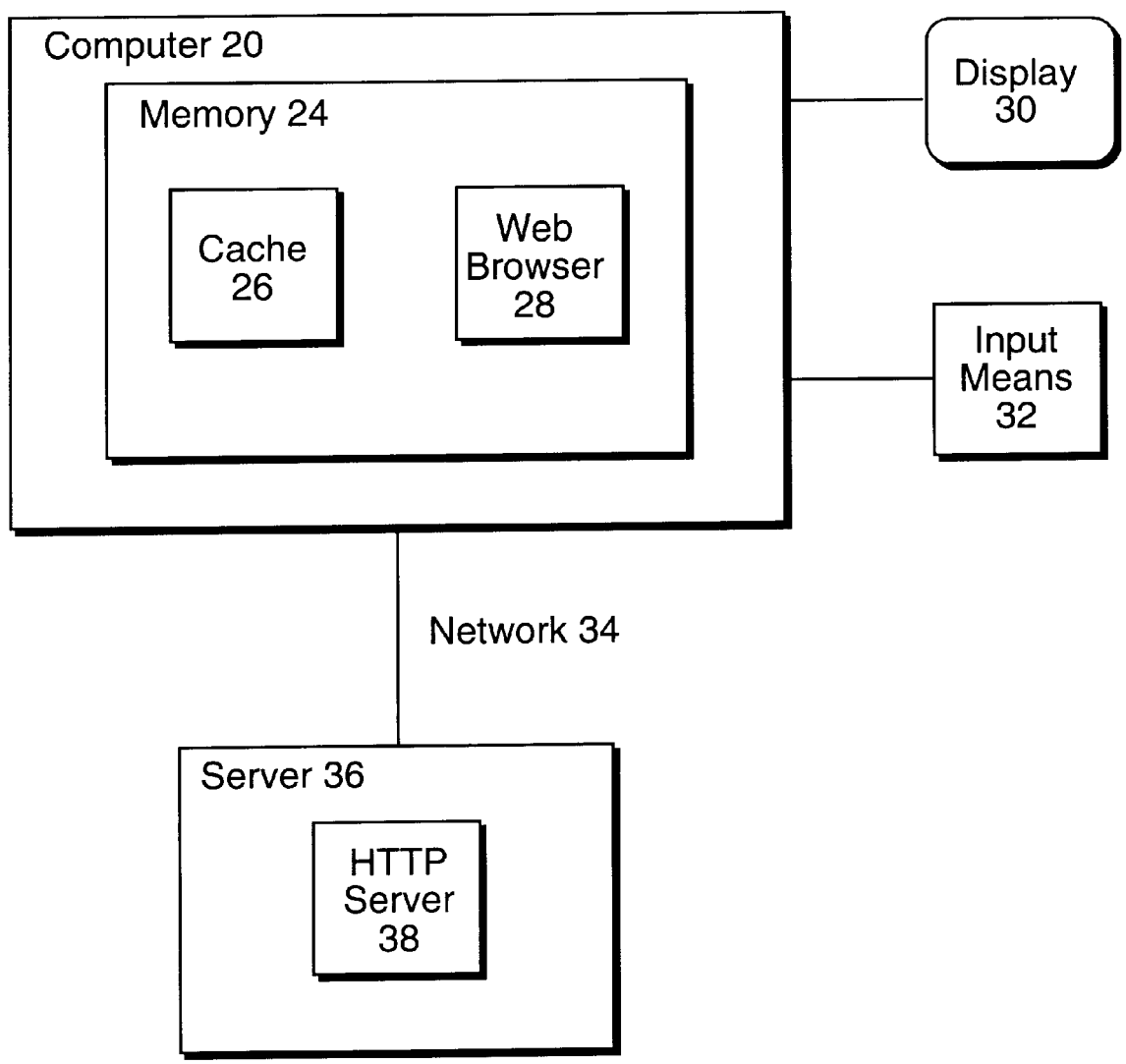
FIG. 3 is a block diagram of a preferred hardware and software environment in which preferred embodiments of the present invention are implemented.

FIG. 3 illustrates a preferred hardware and software environment in which the preferred embodiments of the present invention are implemented. A computer 20 includes a memory 24, comprised of volatile and/or non-volatile memory components within or linked to the computer 20.

The memory 24 includes a cache 26, which is an area of the non-volatile and/or volatile memory 24 areas, and a web browser program 28. The computer 20 may operate under control of any suitable operating system (not shown) known in the art, such as Microsoft Windows™, AIX, Unix, Java™, etc. A display monitor 30 is connected to the computer. The computer 20 may be any personal computer, laptop, palmtop, workstation, mainframe, etc. The display monitor 30 may be any suitable display console known in the art, such as a CRT, LCD, flat panel, etc. An input means 32 is connected to the computer 20 to allow the user to enter information into the computer 20. The input means 32 may be any suitable input means known in the art, such as a keyboard, mouse, touch sensitive screen, voice-activated entry, pen stylus, etc.

The web browser 28 is a program that generates a user interface that allows the user to access computers over a network 34, such as the Internet, and download data from computers linked to the network. In preferred embodiments, the web browser 28 program can process and display files in the Hyper Text Markup Language (HTML) format. The network 34 may be comprised of any suitable network known in the art, e.g., LANs, WANs, SNA networks, the Internet, etc.

The network 34 links the computer 20 to one or more servers 36 that provide access to data maintained in the server 36. The server 36 is comprised of any type of computer machine suitable for serving data to the computer 20 and other systems in communication with the network 34. In preferred embodiments the server 36 includes a Hyper Text Transport Protocol (HTTP) program 38. In alternative embodiments, communication protocols other than the HTTP protocol may be used.

Graphical Representation of Cached Pages

Figure 4:
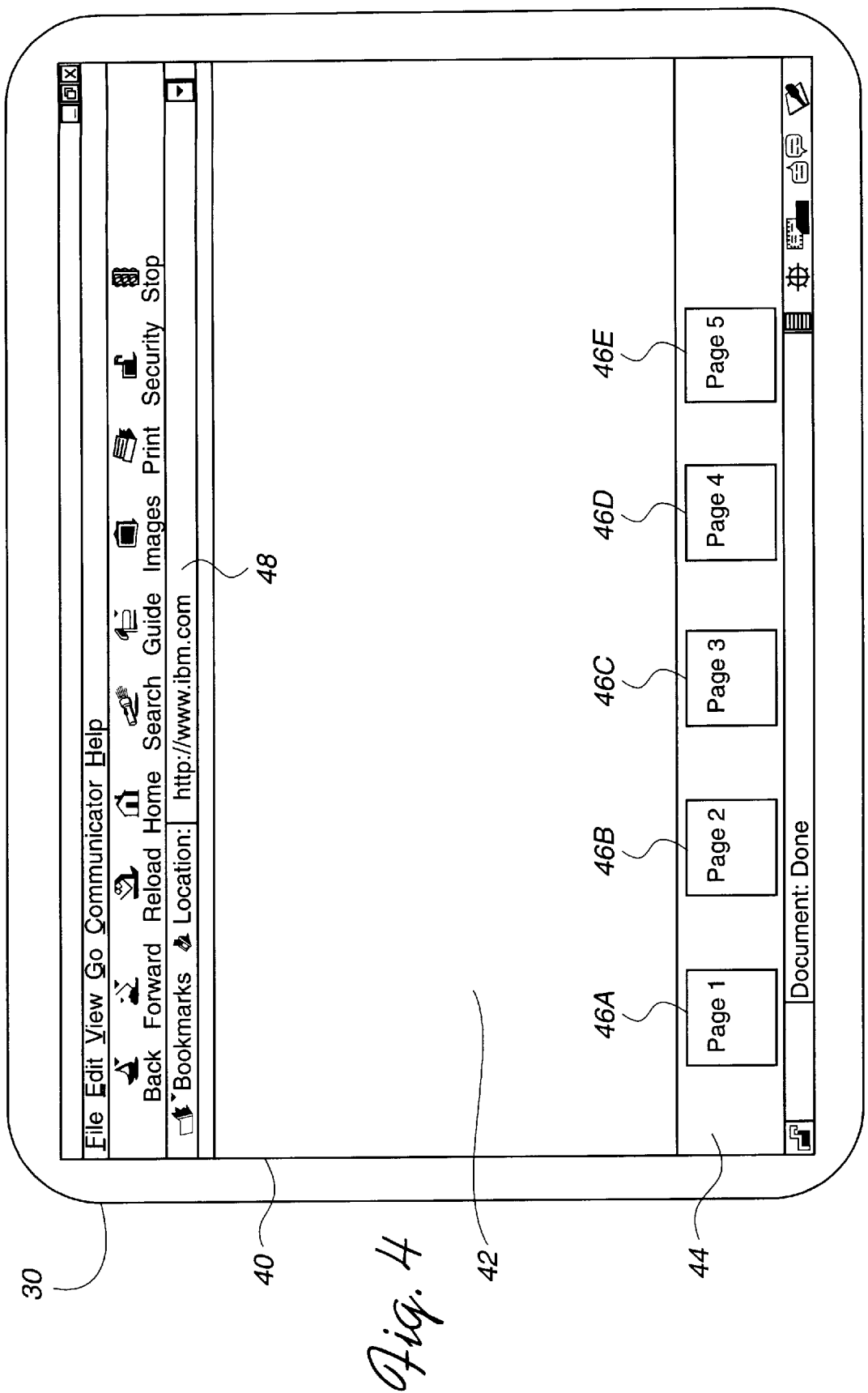
FIG. 4 illustrates a graphical user interface in accordance with preferred embodiments of the present invention.

FIG. 4 illustrates a preferred embodiment of a user interface 40 displayed on the display 30 by the web browser 28. The display includes a content area 42 that displays the contents of a web page and a tiled screen area 44 that displays graphical representations of web pages 46A–E downloaded over the network 34 and stored in the cache 28. The graphical representation of the cached pages 46A–E could consist of a miniature version of the first page of the cached page or one of the images on the cached pages. If one of the images on the cached pages is displayed as the graphical representation, the browser may display the first image on the page, any image on the page that is tagged to be displayed as a graphical representation, or a key image or logo not on the page itself. In other words, the image displayed does not have to be displayed on the original page, but may be a "hidden" image provided by the owner of the remote page. Alternatively, the "miniature version" of the page may consist of the first few words of the page, special words tagged by the owner of the page, the keywords which were used to search out that page, i.e., the meta tags, the title of the page, a color or an animation. The miniature version may also be associated with a sound file that is played when a cursor manipulated by the input means 32 passes over the display of the miniature version of the page. Alternatively, the graphical representation may be a predefined icon that does not display specific data from the cached web page but displays the same icon image for all cached web pages represented in the tiled screen area 44.

In preferred embodiments, the user interface 40 is displayed in a re-sizable, movable window on the display 30. Both the content 42 and tiled screen areas 44 are displayed in this user interface 40 window. In alternative embodiments, the content 42 and tile screen areas 44 may be displayed in separate resizable, movable windows from the window displaying the user interface 40.

The user may select one of the pages 46A–E to display in the content area 42 by selecting the graphical representation of the page 46A–E with the input means 32, e.g., double-clicking the graphical representation 46A–E. Further, the web browser 28 could include a magnification option which displays the input means 32, such as the mouse pointer, as a miniature magnifying glass pointer. The user could then use the magnifying glass pointer to select a page 46A–E to magnify and view the data in the page 46A–E.

The graphical representation of pages 46A–E may represent the most recently visited web pages. Alternatively, the user can select favorite web pages to store in the cache 26 and represent as graphical representations 46A–E in the tiled screen area 44. In this way, the user may readily display the contents of selected favorite pages with the input means 32.

In preferred embodiments, URL information is maintained for each cached page. When the user, using the input means 22, selects the graphical representation of a page 46A–E from the tiled screen area 44, the content of the cached page is displayed in the content area 42. The URL for the cached page displayed in the content area 44 is displayed in a URL area 48 of the user interface 40. The user may update the contents of the page by selecting the reload option from the user interface 40 to download current information for that page from the server 36 identified by the URL for the selected page 46A–E. In FIG. 4, the reload option can be invoked through the "Reload" selectable item displayed at the upper end of the user interface 40.

In further embodiments, the user could select a file menu item to display a window filled with graphical representation of cached pages. Such a window would allow the user to maintain a secondary area of graphical representations of cached pages for those pages of secondary importance. Users could select a cached page by selecting the graphical representation of the cached pages displayed in this secondary window to view in the manner described above.

The web browser 28 may allow the user to set user definable properties of how the graphical representations of pages 46A–E are displayed in the tiled screen area 44. The user could enter this information in a "properties box" displayed within the user interface 40. With the "properties" box, the user may specify the size of the graphical representation displayed in the tiled screen area 44. The user may also set a property to maintain the graphical representation in a secondary window accessible through the user interface 40. The "properties" box may also include a field which allows the user to set the descriptive name displayed with the graphical representation of the page 46A–E in the tiled screen area 44 or to select to display no descriptive name for the page 46A–E. Yet further, if the graphical representation displays a miniature version of a page from the cached web page, then the user may set the magnification level of the data displayed in the graphical representation of the page 46A–E.

All the above described functions may be selected from the file menu items displayed in the upper part of the user interface 40, whether those functions are displayed as graphical representations (user selectable items) or in the file menu items. Alternatively, various functions can be accessed by clicking a mouse button while the mouse pointer is in the vicinity of a graphical representation 46A–E to display a list of functions applicable to the display of the graphical representation. For instance, by pointing the mouse pointer to a page displayed in the content area 42 and single-clicking the right mouse button, a window of options may be displayed. Such window of options could allow the user to cache the displayed page and generate a graphical representation of the page in the tiled screen area 44. Further, when pointing the mouse pointer to a graphical representation and single-clicking the right mouse button, a window of options for displaying and setting the properties of the graphical representation may be displayed.

The user interface 40 shown in FIG. 4 may be implemented using standard HTML programming techniques known in the art. The user may use HTML code to create the content 42 and tiled screen 44 display areas to display the graphical representations 46A–E. Alternatively, if the web browser 26 allows for framing, the tiled screen area 44 could be a separate HTML frame area. Yet further, each graphical representation 46A–E could be generated into a separate HTML frame.

Thus, the preferred embodiments may be implemented as a method, apparatus or article of manufacture using standard programming and/or engineering techniques to code the web browser 28, any portion of the operating system and/or an application program to cause the computer 20 to implement the preferred embodiments. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Caching and Viewing Tiled Pages

Figure 5:
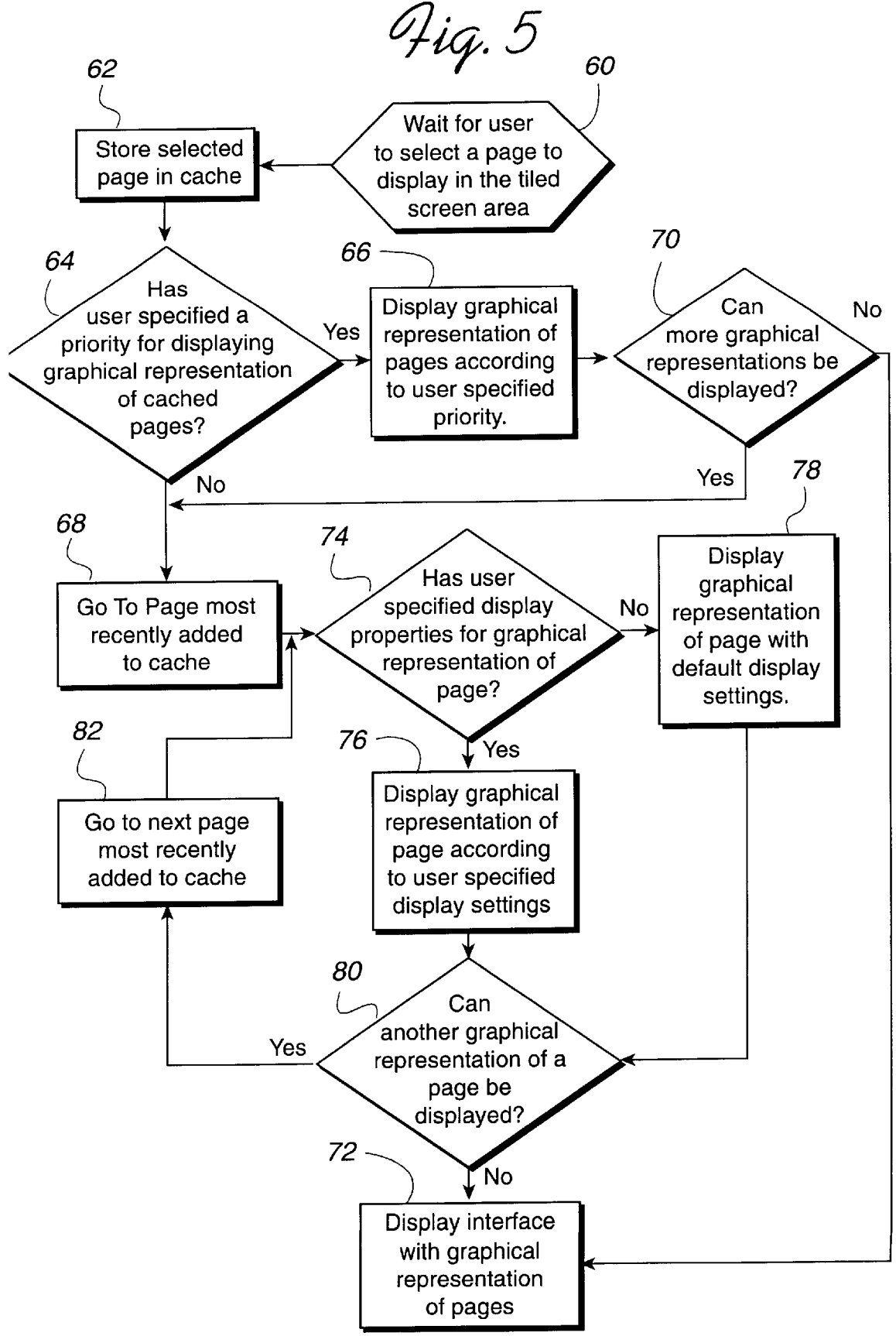
FIG. 5 is a flowchart that shows logic to cache downloaded pages and provide graphical representations of the cached pages in accordance with preferred embodiments of the present invention.
Figure 6:
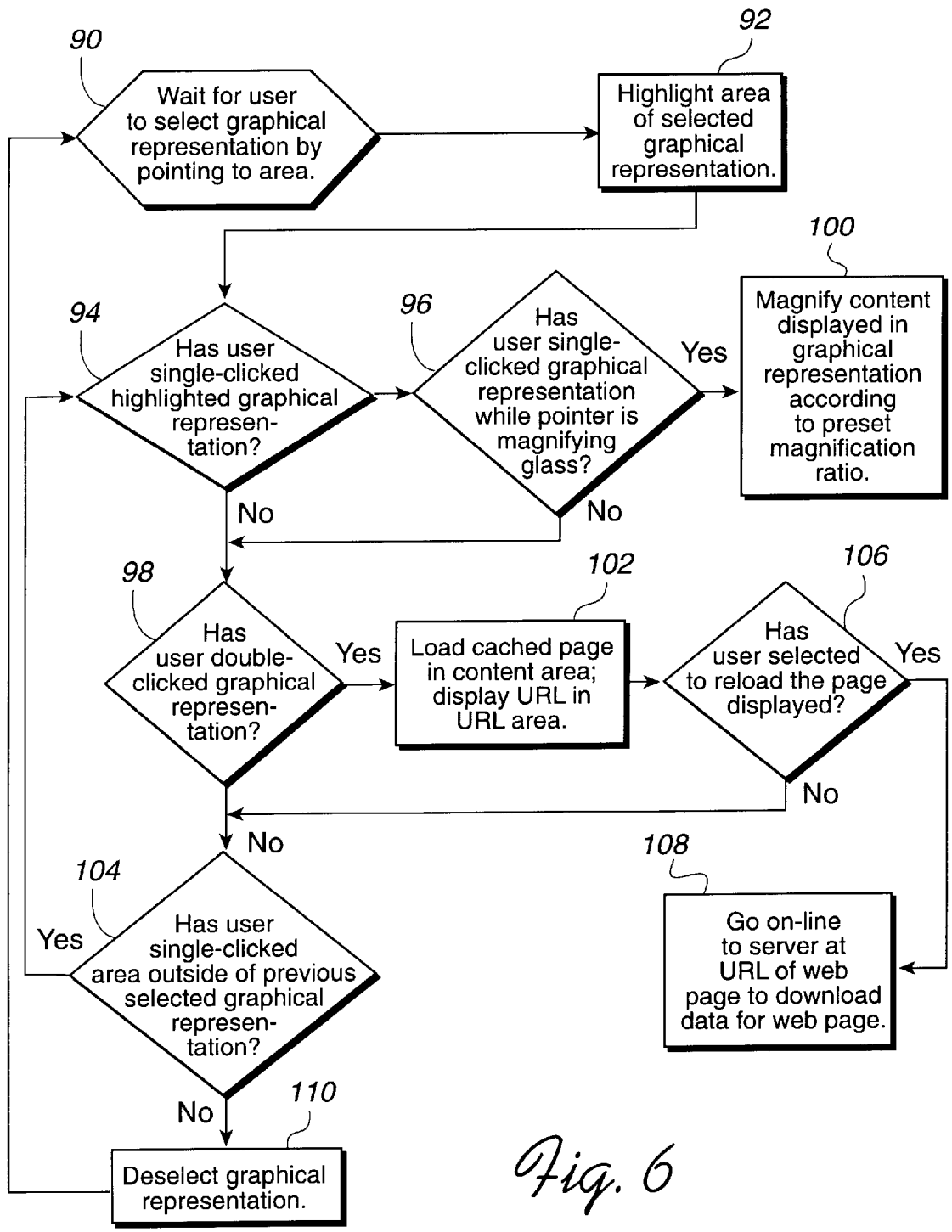
FIG. 6 is a flowchart that shows logic for accessing data in cached pages associated with the graphical representations displayed in the user interface.

FIGS. 5 and 6 illustrate preferred logic for caching, displaying, and viewing web pages in accordance with preferred embodiments of the present invention. In preferred embodiments, the logic of FIGS. 5 and 6 would be implemented in the web browser 28 code. In alternative embodiments, certain of the logic may be implemented in portions of the operating system or application programs that run concurrently with the web browser 28 program. Those skilled in the art will recognize that this logic is provided for illustrative purposes only and that different logic may be used to accomplish the same results.

FIG. 5 illustrates preferred logic for caching and displaying graphical representations of web pages 46A–E. Control begins at block 60 which represents the web browser 28 waiting for the user to select the web page displayed in the content area 42 for the purpose of maintaining a graphical representation of the selected page in the tiled screen area 44. Control transfers to block 62 which represents the web browser 28 storing the selected page in the cache 26. Control then transfers to block 64 which is a decision block representing the web browser 28 determining whether the user has specified a priority for displaying graphical representations of cached pages in the tiled screen area 44. For instance, user setable properties may be provided for each cached web page. With the properties settings, the user may indicate that the graphical representation of a specific cached page is always to be displayed in the tiled screen area 44. In this way, the user can readily access a favorite web page through the graphical representation 46A–E displayed directly in the user interface 40. If the user has specified a priority for displaying cached pages, control proceeds to block 66; otherwise control proceeds to block 68.

Block 66 represents the web browser 28 displaying graphical representations of cached pages according to the priority specified by the user. This graphical representation may be a miniature version of the cached page or an icon providing a generic representation of a page. The graphical representation may include a written descriptor for the page which the user may set. From block 66, control proceeds to block 70 which represents the web browser 28 determining if additional cached pages can be displayed in the tiled screen area 44. If so, control transfers to block 68; otherwise, control transfers to block 72 which represents the web browser 28 displaying the user interface 40 with the graphical representations of the web pages 46A–E in the tiled screen area 44.

If the user has not specified a priority for displaying graphical representations of cached pages 46A–E at block 64 or if additional pages can be displayed at block 70, control proceeds to block 68 which represents the web browser 26 locating the web page most recently added to the cache 26. Control then proceeds to block 74 which represents the web browser 28 determining whether the user has specified display properties for the located page. If so, control transfers to block 76, otherwise, control transfers to block 78. If the user has not specified display properties at block 74, then control proceeds to block 78 which represents the web browser 28 displaying the graphical representation of the located page 46A–E with default display settings. From block 78, control proceeds to block 80. If the user has specified display properties, then control proceeds to block 76 which represents the web browser 28 displaying the graphical representation of the located web page 46A–E according to the user specified display settings.

From blocks 76 and 78, control transfers to block 80 which is a decision block representing the web browser 28 determining whether there is space in the tiled screen area 44 to display additional graphical representations. This can be determined by the web browser 28 checking a maximum number of graphical representations to display or determining if there is sufficient room. If so, control proceeds to block 82; otherwise, control proceeds to block 72 to display the user interface 40. If further pages can be displayed at block 80, then control proceeds to block 82 which represents the web browser 28 locating the next web page most recently added to the cache 26. From block 82, control proceeds to blocks 74 et seq. to display the graphical representation of the located cached page 46A–E.

FIG. 6 illustrates preferred logic for accessing and displaying the content of a cached page associated with the graphical representations 46A–E. In the following logic, a mouse pointer is used as the input means 32 to trigger events and sequence through the program logic. However, those skilled in the art will appreciate that alternative input means 32 can be used to trigger events and carry out the steps performed by the mouse pointer input means 32.

Control begins at block 90 which represents the computer 20, operating under control of the web browser 28 code, waiting for the user to select a graphical representation of a page 46A–E by pointing to the area of the graphical representation with the mouse pointer. Control proceeds to block 92 which represents the web browser 28 highlighting the selected graphical representation 46A–E. Control then proceeds to block 94 which represents the web browser 28 determining if the user single-clicked the mouse button while the pointer is positioned in the area of the elected graphical representation 46A–E. If so, control transfers to block 96; otherwise, control transfers to block 98.

Block 96 represents the web browser 28 determining whether the user single-clicked the selected tiled page 46A–E while the pointer is displayed as a magnifying glass. As discussed, the web browser 28 could include a magnifying glass feature which would turn the mouse pointer into a magnifying glass. Control transfers to block 100 which represents the web browser 28 magnifying the content of the page associated with the selected graphical representation 46A–E. The magnified content is displayed in the content area 42 according to a predefined magnification ratio. The user may alter the magnification level by controlling the settings of the magnifying function in a manner known in the art. If the graphical representation includes content from the cached page scaled to the size of the graphical representation, then the magnification feature would magnify and display the content displayed within the graphical representation. If the graphical representation is a predefined icon and does not include actual data, then applying the magnification feature to the predefined icon could cause the display of the first page of the cached page.

In the embodiment of FIG. 6 at steps 94 and 96, single-clicking the highlighted graphical representation 46A–E when the mouse pointer is not represented as a magnifying glass does not trigger a specific event. Control transfers from blocks 94 and 96 to block 98 which represents the web browser 28 determining whether the user has double-clicked a graphical representation. If so, control transfers to block 102; otherwise, control transfers to block 104. If the user double-clicked a graphical representation 46A–E, then control transfers to block 102 which represents the web browser 28 displaying the contents of the cached page associated with the graphical representation into the content area 42. The URL for the cached page displayed in the content area 42 is displayed in the URL display area 48. Because the local cached copy of the page is displayed, the page may not include the most recent data that is available at the URL address for the displayed page.

Control proceeds to block 106 which represents the web browser 28 determining whether the user selected the option on the browser user interface 40 to reload the contents of the web page displayed in the content area 42. If so, control transfers to block 108; otherwise, control transfers to block 104. Block 108 represents the web browser 28 connecting to the network 34 to download the current material from the server 36 at the URL associated with the page displayed in the content area 42. The display area 40 is then refreshed with the current contents maintained at the URL location in the network 34.

If the user has not double-clicked the page at block 98, control proceeds to block 104 which is a decision block representing the web browser 28 determining whether the user has single-clicked an area outside of the currently selected graphical representation 46A–E. If so, control transfers to block 110; otherwise, control proceeds back to block 94 to determine the course of action based on data entered by the input means 32 concerning the selected graphical representation 46A–E. Block 110 represents the user deselecting the graphical representation and the web browser 28 removing the highlighting of the deselected graphical representation 46A–E. Control then proceeds back to block 90 to wait for the user to select a graphical representation and perform an action.

Conclusion

This concludes the description of the preferred embodiments of the invention. The following describes some alternative embodiments for accomplishing the present invention.

In further embodiments, more or less graphical representations 46A–E of cached pages could be displayed on the user interface 40. Further, the tiled screen area 44 could be located in an area of the user interface 40 different than that shown in FIG. 4. Still further, the tiled screen area 44 could comprise a greater portion of the displayed user interface 40 than is shown in FIG. 4.

Preferred embodiments were described with respect to HTML web pages downloaded from a network such as the Internet or an Intranet. However, in alternative embodiments the pages downloaded from the server 36 via the network 34 and maintained in the cache 26 may be any type of data file and may be in a format other than HTML code. In further embodiments, the page may be written in a virtual reality type language, such as the Virtual Reality Markup Language (VRML), wherein the pages or graphical representations of the pages are three dimensional, animated objects.

In preferred embodiments, the URL for a downloaded page is maintained in the cache. The URL may define any Internet protocol known in the art, including HTTP, WAIS, FTP, GOPHER, NEWS, etc.

In summary, preferred embodiments in accordance with the present invention provide a system for displaying and accessing information on files downloaded from a server over a network. A monitor linked to a computer displays a graphical user interface. The computer is linked to the network. The graphical user interface is used to download a plurality of files from the server over the network. The files downloaded from the server are stored in a cache associated with the computer. At least one graphical representation of a file stored in the cache is displayed in a display region of the graphical user interface. An input means may be used to select a file by selecting with the input means one of the displayed graphical representations of the files. The input means is further used to cause the display of data stored in the selected file in the display region of the graphical user interface.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for displaying and accessing files downloaded from servers over a network, comprising:

displaying a graphical user interface on a monitor linked to a computer, wherein the computer is linked to the network;

using the graphical user interface to download a plurality of files from multiple servers over the network, wherein at least two of the downloaded files have network addresses for different servers;

storing the files downloaded from the servers in a cache associated with the computer;

displaying content of one file in a display region;

displaying graphical representations of at least two of the files stored in the cache in the display region, wherein at least two of the graphical representations are associated with files downloaded from different servers over the network, and wherein the graphical representations continue to be displayed in the display region if the display region is updated to display content from another file;

selecting one of the files by selecting with an input means one of the displayed graphical representations of the files; and executing an action with the input means to cause the display of data stored in the selected file in the display region of the graphical user interface.

2. The method of claim 1, wherein the steps of selecting a file and executing an action with the input means to cause the display of data occurs during the execution of a single action with the input means.

3. The method of claim 1, wherein the step of displaying the graphical representation of a file stored in the cache further includes the step of displaying in the graphical representation data stored in the file associated with the graphical representation.

4. The method of claim 3, further including the steps of:
executing an action with the input means to magnify the data displayed in the selected graphical representation; and
displaying the magnified data on the monitor.

5. The method of claim 1, wherein the graphical user interface and display regions are displayed within a resizable, movable window.

6. The method of claim 1, wherein the files downloaded from the server and stored in cache are in Hypertext Markup Language (HTML) format.

7. The method of claim 1, wherein each file downloaded from the servers is associated with a Uniform Resource Locator (URL) that identifies the route to the server in the network providing the file, wherein the step of storing the files downloaded from the servers further includes the step of storing the URL for each file, further comprising:
executing an action with the input means to request the data maintained at the URL location in the network for the selected file;
downloading the requested data from the URL location in the network to the computer; and
displaying the downloaded data in the display region of the graphical user interface.

8. The method of claim 1, further including the steps of:
entering with the input means display properties for the files stored in the cache; and
displaying the graphical representation of files in the cache in accordance with the display properties entered with the input means.

9. The method of claim 1, further including:
displaying data from a file downloaded from one server over the network in the display region of the graphical user interface;
executing a saving action with the input means to store the file displayed in the display region and a Uniform Resource Locator (URL) at the server from where the file was downloaded for the displayed file in the cache, wherein the
graphical representation of the file stored in the cache is displayed in response to the saving action.

10. The method of claim 1, wherein the step of displaying the graphical representation comprises the step of displaying a graphical representation that is a member of the set of graphical representations comprising:
a miniature graphical representation of the page;
an image included in the page;
an image included in the page that is tagged to be displayed;
an image associated with the page that is not displayed when the page is displayed;
an alpha-numeric string;
an arrangement of at least one color;
a display of a sequence of images; and
an image associated with a sound file, wherein the sound file is executed to produce sound when the image graphical representation is selected.

11. The method of claim 1, wherein displaying the graphical representations comprises displaying the graphical representations associated with the most recently downloaded files.

12. The method of claim 1, further comprising selecting files in the cache, wherein displaying the graphical representations comprises displaying the graphical representations associated with the selected files in cache.

13. The method of claim 1, wherein the display region comprises a first display region and a second display region, wherein the content of the file is displayed in the first display region and the graphical representations are displayed in the second display region, further comprising:
receiving user selection of a new file, wherein there is no graphical representation of the new file displayed in the second display region; and
displaying the content of the new file in the first display region to replace the content currently displayed in the first display region, wherein the graphical representations in the second display region continue to be displayed when the content from the from the new file is displayed in the first display region.

14. A computer apparatus for displaying and accessing files downloaded from servers over a network, comprising:
a computer linked to the network;
a display monitor linked to the computer;
a graphical user interface displayed on the display monitor for downloading a plurality of files from multiple servers over the network, wherein at least two of the downloaded files have network addresses for different servers;
a cache in the computer for storing the files downloaded from the network;
a display region in the graphical user interface for displaying content of one file in a display region and graphical representations of files stored in the cache, wherein at least two of the graphical representations are associated with files downloaded from different servers over the network, and wherein the graphical representations continue to be displayed in the display region if the display region is updated to display content from another file;
input means for selecting one of the files by selecting with the input means one of the displayed graphical representations of the files; and
means for displaying data stored in the selected file in the display region.

15. The apparatus of claim 14, further including means for displaying in the graphical representation data stored in the file represented by the graphical representation.

16. The apparatus of claim 15, further including:
  magnification means to magnify data displayed in the selected graphical representation; and
  means for displaying the magnified data in the display monitor.

17. The apparatus of claim 14, further including means to display the graphical user interface and display regions within a resizable, movable window.

18. The apparatus of claim 14, further including:
  means for storing with each file stored in the cache a Uniform Resource Locator (URL) that identifies the route to the file in the servers in the network;
  means for downloading data maintained at the URL location in the network for the selected file; and
  means for displaying the downloaded data in the display region of the graphical user interface.

19. The apparatus of claim 14, further including the steps of:
  means, performed by the input means, for entering display properties for the files stored in the cache; and
  means for displaying the graphical representation of files in the cache in accordance with the display properties entered with the input means.

20. The apparatus of claim 14, further including:
  means for displaying data from a file downloaded from one server over the network in the display region of the graphical user interface;
  means, performed by the input means, for storing the file displayed in the display region and a Uniform Resource Locator (URL) at the server from where the file was downloaded for the displayed file in the cache, wherein the
  graphical representation of the file stored in the cache is displayed in response to the saving action.

21. The apparatus of claim 14, further including means for generating a graphical representation that is a member of the set of graphical representations comprising:
  a miniature graphical representation of the page;
  an image included in the page;
  an image included in the page that is tagged to be displayed;
  an image associated with the page that is not displayed when the page is displayed;
  an alpha-numeric string;
  an arrangement of at least one color;
  a display of a sequence of images; and
  an image associated with a sound file, wherein the sound file is executed to produce sound when the graphical representation is selected.

22. The system of claim 14, wherein the means for displaying the graphical representations comprises displaying the graphical representations associated with the most recently downloaded files.

23. The system of claim 14, further comprising means for selecting files in the cache, wherein the means for displaying the graphical representations comprises displaying the graphical representations associated with the selected files in cache.

24. The system method of claim 14, wherein the display region comprises a first display region and a second display region, wherein the content of the file is displayed in the first display region and the graphical representations are displayed in the second display region, further comprising:
  means for receiving user selection of a new file, where there is no graphical representation of the new file displayed in the second display region; and
  means for displaying the content of the new file in the first display region to replace the content currently displayed in the first display region, wherein the display the graphical representations continue to be displayed in the second display region when the content from the from the new file is displayed in the first display region.

25. An article of manufacture for use in programming a computer linked to servers over a network, the article of manufacture comprising a computer readable storage medium including at least one program that causes the computer to perform:
  displaying a graphical user interface on a monitor linked to the computer;
  downloading a plurality of files from multiple servers over the network, wherein at least two of the downloaded files have network addresses for different servers;
  storing the files downloaded from the servers in a cache of the computer;
  displaying in a display region of the graphical user interface content of one file and graphical representations of at least two of the files stored in the cache, wherein at least two of the graphical representations are associated with files downloaded from different servers over the network, and wherein the graphical representations continue to be displayed in the display region if the display region is updated to display content from another file;
  selecting one of the files in response to an input means linked to the computer selecting one of the displayed graphical representations of the files; and
  displaying data stored in the selected file in the display region of the graphical user interface in response to an action from the input means.

26. The article of manufacture of claim 25, wherein the steps of selecting a file and executing an action with the input means to cause the display of data occurs during the execution of a single action with the input means.

27. The article of manufacture of claim 25, wherein the step of displaying the graphical representation of a file stored in the cache further includes the step of displaying in the graphical representation data stored in the file represented by the graphical representation.

28. The article of manufacture of claim 27, further including the steps of:
  magnifying the data displayed in the selected graphical representation in response to action by the input means; and
  displaying the magnified data in the monitor.

29. The article of manufacture of claim 25, further including the step of displaying the graphical user interface and display regions within a resizable, movable window.

30. The article of manufacture of claim 25, wherein each file downloaded from the servers is associated with a Uniform Resource Locator (URL) that identifies the route to the file in the network, wherein the step of storing the files downloaded from the server further includes the step of storing the URL for each file, further comprising:
  requesting the data maintained at the URL location in the network for the selected file in response to action by the input means;
  downloading the requested data from the URL location in the network to the computer; and
  displaying the downloaded data in the display region of the graphical user interface.

31. The article of manufacture of claim 25, further including the steps of:
   storing display properties for the files stored in the cache in response to information entered by the input means; and
   displaying the graphical representation of files in the cache in accordance with the display properties entered with the input means.

32. The article of manufacture of claims 25, further including:
   displaying data from a file downloaded from one server over the network in the display region of the graphical user interface;
   storing the file displayed in the display region and a Uniform Resource Locator (URL) at the server from where the file was downloaded for the displayed file in the cache in response to action by the input means, wherein the
      graphical representation of the file stored in the cache is displayed in response to the saving action.

33. The article of manufacture of claim 25, wherein the step of displaying the graphical representation comprises the step of displaying a graphical representation that is a member of the set of graphical representations comprising:
   a miniature graphical representation of the page;
   an image included in the page;
   an image included in the page that is tagged to be displayed;
   an image associated with the page that is not displayed when the page is displayed;
   an alpha-numeric string;
   an arrangement of at least one color;
   a display of a sequence of images; and
   an image associated with a sound file, wherein the sound file is executed to produce sound when the image graphical representation is selected.

34. The article of manufacture of claim 25, wherein displaying the graphical representations comprises displaying the graphical representations associated with the most recently downloaded files.

35. The article of manufacture of claim 25, further comprising selecting files in the cache, wherein displaying the graphical representations comprises displaying the graphical representations associated with the selected files in cache.

36. The article of manufacture of claim 25, wherein the display region comprises a first display region and a second display region, wherein the content of the file is displayed in the first display region and the graphical representations are displayed in the second display region, further comprising:
   receiving user selection of a new file, where there is no graphical representation of the new file displayed in the second display region; and
   displaying the content of the new file in the first display region to replace the content currently displayed in the first display region, wherein the graphical representations continue to be displayed in the second display region when the content from the new file is displayed in the first display region.

37. A method for displaying and accessing files downloaded from servers over a network, comprising:
   displaying a graphical user interface on a monitor linked to a computer, wherein the computer is linked to the network;
   storing files downloaded from the servers in a cache associated with the computer;
   displaying first content from a first file in a display region;
   displaying graphical representations of files previously downloaded from the server over the network in the display region; and
   displaying second content from a second file in the display region, wherein the second content replaces the display of the first content;
   continuing to display the graphical representations in the display region while the second content is displayed.

38. The method of claim 37, wherein the display region comprises a first display region and a second display region, wherein the content of the file is displayed in the first display region and the graphical representations are displayed in the second display region.

39. The method of claim 37, further comprising:
   receiving user selection of one of the displayed graphical representations; and
   displaying in the display region third content from the file represented by the selected graphical representation in response to receiving the user selection, wherein the display of the third content replaces the display of the second content in the display region; and
   continuing to display the graphical representations in the display region while the third content is displayed.

40. A system for displaying and accessing files downloaded from servers over a network, comprising:
   a computer linked to the network;
   a display monitor linked to the computer;
   means for displaying a graphical user interface on the display monitor;
   means for storing files downloaded from the servers in a cache associated with the computer;
   means for displaying first content from a first file in a display region of the graphical user interface;
   means for displaying graphical representations of files previous downloaded from the server over the network in the display region;
   means for displaying second content from a second file in the display region, wherein the second content replaces the display of the first content; and
   means for continuing to display the graphical representations in the display region while the second content is displayed.

41. The system of claim 40, wherein the display region comprises a first display region and a second display region, wherein the content of the file is displayed in the first display region and the graphical representations are displayed in the second display region.

42. The system of claim 41, further comprising:
   means for receiving user selection of one of the displayed graphical representations; and
   means for displaying in the display region third content from the file represented by the selected graphical representation in response to receiving the user selection, wherein the display of the third content replaces the display of the second content in the display region; and
   means for continuing to display the graphical representations in the display region while the third content is displayed.

43. An article of manufacture for use in displaying and accessing files downloaded from servers over a network, the article of manufacture comprising a computer readable storage medium including at least one program that causes the computer to perform:

displaying a graphical user interface on a monitor linked to a computer, wherein the computer is linked to the network;

storing files downloaded from the servers in a cache associated with the computer;

displaying first content from a first file in a display region;

displaying graphical representations of files previously downloaded from the server over the network in the display region; and displaying second content from a second file in the display region, wherein the second content replaces the display of the first content;

continuing to display the graphical representations in the display region while the second content is displayed.

44. The article of manufacture of claim 43, wherein the display region comprises a first display region and a second display region, wherein the content of the file is displayed in the first display region and the graphical representations are displayed in the second display region.

45. The article of manufacture of claim 43, further comprising:

receiving user selection of one of the displayed graphical representations; and displaying in the display region third content from the file represented by the selected graphical representation in response to receiving the user selection, wherein the display of the third content replaces the display of the second content in the display region; and continuing to display the graphical representations in the display region while the third content is displayed.

* * * * *

UNITED STATES PATENT AND TRADEMARK OFFICE
CERTIFICATE OF CORRECTION

PATENT NO.        : 6,133,916
APPLICATION NO.   : 09/056915
DATED             : October 17, 2000
INVENTOR(S)       : Anna E. Bukszar, Clifford A. Pickover and Daniel James Winarski It is certified that error appears in the above-identified patent and that said Letters Patent is hereby corrected as shown below:

Claim 22, column 11, line 51, please delete ~~The system of claim 14~~ and insert therefore <u>The apparatus of claim 14</u>

Claim 23, column 11, line 55, please delete ~~The system of claim 14~~ and insert therefore <u>The apparatus of claim 14</u>

Claim 24, column 11, line 60, please delete ~~The system method of claim 14~~ and insert therefore <u>The apparatus of claim 14</u>

Signed and Sealed this

Twenty-fifth Day of September, 2007

JON W. DUDAS
*Director of the United States Patent and Trademark Office*